UNITED STATES PATENT OFFICE.

WESLEY GROFF NICHOLS, OF CHICAGO, ILLINOIS, ASSIGNOR TO AMERICAN MANGANESE STEEL COMPANY, OF CHICAGO, ILLINOIS, A CORPORATION OF MAINE.

METHOD OF MAKING MANGANESE STEEL.

1,291,655. Specification of Letters Patent. Patented Jan. 14, 1919.

No Drawing. Continuation of application Serial No. 91,118, filed April 14, 1916. This application filed March 2, 1917. Serial No. 151,882.

*To all whom it may concern:*

Be it known that I, WESLEY G. NICHOLS, a citizen of the United States, and resident of Chicago, in the county of Cook and State of Illinois, have invented certain new and useful Improvements in Methods of Making Manganese Steel, of which the following is a specification.

My invention relates to the art of making steel and has particular reference to a method of making manganese steel by the Bessemer process.

This application is a continuation of my application, Serial Number 91,118, filed April 14, 1916.

In the following specification and claims the term "manganese steel" will be used to denote steel showing a manganese content by commercial analysis of 11 to 14 per cent., and carbon 1.1 to 1.4 per cent.; the term "blown metal" will be used to denote decarburized iron such as results from the completed Bessemer operation in a converter, and "ferro-manganese" to denote the commercial product containing an average of 80 per cent. manganese, 6 per cent. carbon and 10 to 12 per cent. iron.

The common practice in making manganese steel from Bessemer metal has been to weigh the iron after leaving the cupola and before being blown; after being blown and while having a slag coating the manganese alloy was added. I have varied this practice by weighing the metal after being blown instead of before and after removing the slag. The analysis is therefore positive and there is removed the danger of an excess of slag on the blown metal which in some instances reduces the temperature of the heat and absorbs a quantity of manganese. By my method the blown metal having a positive analysis and an exactly known quantity is supplied with a known quantity of alloy having a known analysis. Furthermore the temperature of the blown metal is maintained at a high point while the temperature of the alloy is maintained at such lower point as will give the necessary fluidity without oxidation and such that when the necessary proportion thereof is combined with the high temperature blown metal the product may be immediately poured at a proper temperature. In this relation it will be noted that I require an alloy of such percentage of manganese as will necessitate the addition only of such quantity of the alloy at its necessary temperature as will combine with the high temperature blown metal to produce a manganese steel of the proper analysis at the exact temperature for pouring.

An alloy such as required may be produced in any desired manner. It may, however, be advantageously produced in accordance with the method of my co-pending application, Serial Number 152,107, filed concurrently herewith. That method is substantially as follows:

Charging a furnace in which a substantially non-oxidizing atmosphere is maintained and preferably a furnace of the electric arc type, with cold manganese steel scrap, the furnace at the time of charging the scrap having a temperature not substantially above 1200 F.; maintaining in the furnace a suitable temperature at which manganese steel does not readily oxidize and whereby the scrap is brought to a dull red heat, then gradually increasing the voltage and consequently the temperature until the scrap becomes practically fluid; then charging into the furnace a known quantity of ferro-manganese sufficient to raise the manganese content to substantially 20 per cent. Following the charging of the ferro-manganese, a small quantity of a reducing agent may be introduced and the temperature in the furnace increased to raise the temperature of the bath to such a degree that a quantity thereof may be tapped without danger of freezing. Inasmuch as this bath of metal is intended as an alloy it must be retained in the furnace for a considerable length of time as it cannot be used all at once. I propose therefore to so regulate the voltage that the temperature in the furnace shall be maintained at slightly above the melting point of the manganese steel at which temperature there is practically no oxidation in a substantially non-oxidizing atmosphere. Neither is there volatilization because the arc used to maintain such temperature will not be of great length. I may desire in order to further protect the bath to provide a thin basic slag and at intervals to add a small quantity of a reducing agent thereto. The quantity will be so small as to have little or no effect in recarburizing the bath.

The steps herein referred to can best be carried out in an electric furnace of the voltaic arc type, means being associated therewith for varying the tension of the fluid in order to secure the necessary variations in heat. For instance I prefer to begin the scrap heating operation at a voltage of approximately 40, controlling the spacing of the electrodes and consequently the length of the arc, in order to maintain a furnace temperature of substantially 1200 F. This is maintained until such time as the scrap is heated evenly to a dull red. It is then desirable that the furnace temperature be gradually increased in order that the heat may be equalized throughout the body of metal to be melted before the furnace is raised to a melting temperature. This is accomplished by increasing the voltage gradually to approximately 60, and likewise lengthening the arc. At this point the furnace temperature should be at approximately 2400 F., which is a few degrees above the melting point of manganese steel of the analysis hereinbefore given. It may later be desirable to increase the furnace temperature for a short time following the addition of ferro-manganese or just before pouring and this is done by increasing the voltage as before. After the alloy has been withdrawn, the furnace is permitted to cool down to approximately 1200 F. before a further quantity of cold scrap is charged.

It will be understood, however, that there is no relation between the particular voltage mentioned and the results secured. The invention contemplates a certain treatment of the metal at certain temperatures in a substantially non-oxidizing atmosphere; it is therefore immaterial as to the exact manner in which the heat is applied. It might be advantageous to carry out the invention in an induction furnace of the Kjellin type, or in a large gas-fired crucible.

The temperatures specified in the specification and claims are approximate only, and may be varied somewhat without destroying the efficiency of the method.

What I claim is:

1. The method of making manganese steel, which consists in weighing a quantity of blown metal without slag, said metal having a temperature of approximately 3000 F., adding thereto a sufficient quantity of a manganese steel alloy at a temperature of approximately 2400 F. to produce a steel having a manganese content of 11 per cent. to 14 per cent. and of proper pouring temperature, and then pouring the metal, substantially as described.

2. The method of making manganese steel, which consists in providing a known quantity of slagless blown metal having a relatively high temperature, adding thereto a known quantity of manganese steel alloy of a temperature below that at which manganese oxidizes freely, said alloy containing such percentage of manganese as will result in a product having a manganese content of 11 per cent. to 14 per cent., the quantity and temperature of the blown metal and the quantity and temperature of the alloy being so proportioned as to produce a steel which may be immediately poured at a proper pouring temperature, substantially as described.

3. The method of making manganese steel, which consists in blowing metal, separating the slag therefrom, weighing the metal while at a temperature of substantially 3000 F., then adding thereto a sufficient quantity of 20 per cent. manganese steel alloy at a temperature of substantially 2400 F. to produce a steel having a content of 11 per cent. to 14 per cent. manganese and of proper temperature for pouring, then pouring the metal into molds, substantially as described.

Signed at Chicago, Illinois, this 27th day of February, A. D. 1917.

WESLEY GROFF NICHOLS.

Witnesses:
C. J. MARCUSON,
H. E. OSTEN.